United States Patent [19]

Peters

[11] 4,107,989
[45] Aug. 22, 1978

[54] DECORATIVE WIND VELOCITY AND DIRECTIONAL INDICATOR

[76] Inventor: George Peters, 313 Lydia La., Cheektowaga, N.Y. 14225

[21] Appl. No.: 817,137

[22] Filed: Jul. 20, 1977

[51] Int. Cl.² .............................................. G01W 1/02
[52] U.S. Cl. .................................................... 73/189
[58] Field of Search ..................... 73/189, 229, 194 R; 116/117 R

[56] References Cited

U.S. PATENT DOCUMENTS 2,919,577  1/1960  Cone .................................. 73/189 X
3,359,795  12/1967  Walsh .................................... 73/189

Primary Examiner—Jerry W. Myracle

[57] ABSTRACT

A wind velocity indicator is disclosed in which the force of air impinging on a lower surface of a moveable rotating disk causes the disk to ascend a shaft to a position proportional to the wind speed. A system for incrementally adding weights to the top of the disk is provided in order that the altitude of the disk along the shaft represent an indication of wind speed. The system is further provided with visual means for permitting the indicated wind speed to be remotely determined.

18 Claims, 9 Drawing Figures

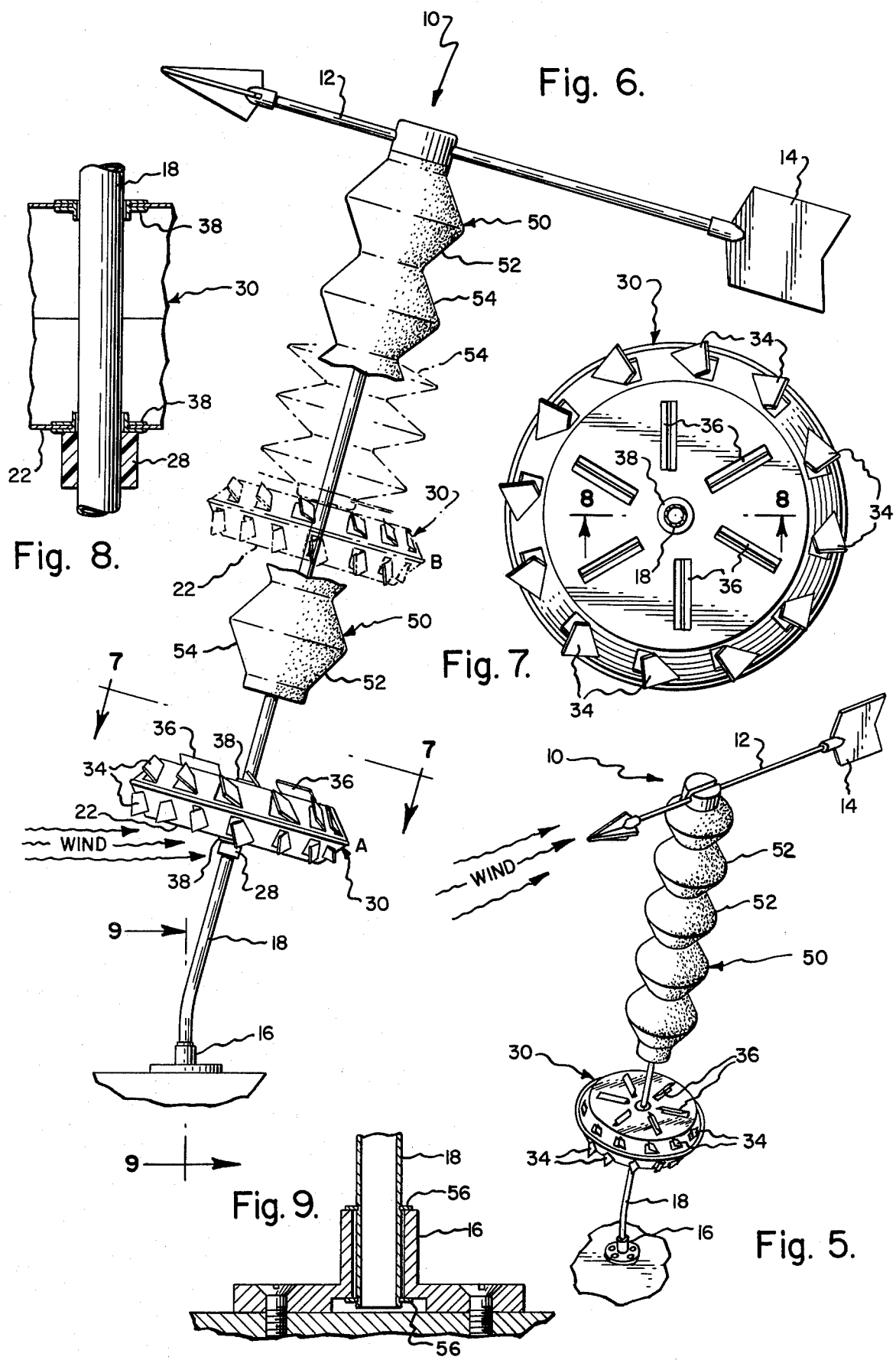

DECORATIVE WIND VELOCITY AND DIRECTIONAL INDICATOR

BACKGROUND OF THE INVENTION

The present invention relates to a wind driven device. More specifically, the present invention relates to a remotely readable wind speed indicating device suitable for mounting in a position distant from a building. The device is both ornamental and serves the utilitarian functions of indicating wind direction and wind speed.

Devices which respond to the movement of air to move an object up and down along a vertical rod are known. Such devices appear, for example, in U.S. Pat. Nos. 2,227,918; 2,637,928; and 2,919,577. While the devices disclosed in these patents teach generally the concept of causing an object to move up and down a generally vertically disposed rod, these devices amount to little more than toys designed for the purpose of the amusement of a passenger while traveling in an automobile. As such, the disclosed toys are not capable of producing a remotely readable wind velocity indication as is required when one wants to determine the wind velocity in the vicinity of a dwelling or other structure. Devices mounted close to an obstruction such as a vehicle or a building are incapable of producing a reliable wind velocity indication due to the local effects of turbulance induced by the flow of the air around the obstruction. Of the toys disclosed in the three above cited patents, only that disclosed in U.S. Pat. No. 2,919,577 is capable of indicating a wind speed at all; the other two being directed to toys which oscillate up and down a rod. U.S. Pat. Nos. 966,950 and 2,040,305 also disclose machines responsive to the wind but do not include the feature of a wind driven object climbing a vertically disposed rod to a position proportional to wind speed.

SUMMARY OF THE INVENTION

The wind velocity indicator of the present invention is an attractive and inexpensive device which is capable of being read remotely so that it may be mounted an adequate distance from a building in order to avoid the turbulent effects caused by wind passing around the building. The wind velocity apparatus of the invention comprises a base, a generally vertically disposed shaft supported from the base, a rotatable disk mounted on the shaft for rotation around its rotational axis of symmetry, and a system also mounted on the shaft above the rotatable disk for successively adding weights to the top of the rotatable disk as the disk ascends the shaft. The apparatus is configured so that wind impinging on the disk not only causes the disk to rotate but also causes the disk to rise up the shaft a distance proportional to the speed of the wind. The apparatus also includes a remotely detectable means for permitting the velocity of the wind to be remotely ahead.

In one embodiment, the apparatus comprises a vertically disposed shaft with a rotatable disk having a convex lower surface and a non-convex upper surface. The disk also includes blades or air scoops which catch the wind and cause the disk to rotate, thereby dramatically decreasing the coefficient of friction between the disk and the shaft and thereby facilitating vertical movement of the disk along the shaft. In another embodiment, the rotatable disk has generally similar upper and lower convex surfaces. In this second embodiment, the disk is mounted on a shaft which is angled to the vertical. The angled shaft in turn is rotationally mounted in its base and has a wind responsive vane structure which causes the shaft to rotate so that its top end leans away from the prevailing wind direction. The tilted shaft causes the disk to present its lower surface to the wind so that the wind may exert a lift on the disk which causes the disk to climb the shaft.

According to the invention, there is also included a structure mounted on the shaft above the disk which incrementally, semicontinuously or continuously adds weight to the top of the rotating disk as the disk ascends. This structure limits the upward movement of the disk dependent on wind velocity and therefore effects a unique wind speed indication. In a preferred form, the weight adding system includes a series of telescoping cylinders positioned around the shaft and suspended from the top of the shaft, each cylinder depending from the cylinder above. The external visible surfaces of these cylinders may desirably be colored different colors to permit a determination of wind velocity on the basis of the remotely visible colors. Other weight adding arrangements are possible such as the provision of a collapsible cylindrical bellows which is accordion folded as the rotating disk climbs the shaft.

BRIEF DESCRIPTION OF THE DRAWINGS

The present invention may be better understood and its numerous objects and advantages will become apparent by reference to the accompanying drawings wherein like reference numerals refer to like elements in the several figures and in which:

FIG. 5 is a perspective view of one embodiment of the invention in which the generally vertical rod is formed at an angle to the vertical;

FIG. 6 is a side elevation of the apparatus shown in FIG. 5;

FIG. 7 is a top plan view of the rotatable disk mounted on the rods of FIGS. 5 and 6;

FIG. 8 is a cross-section elevational view of a portion of the disk shown in FIG. 7 and showing the bearing arrangement of the disk; and FIG. 9 is a cross-sectional view of the mounting arrangement for the pivotal rod shown in FIG. 6.

DESCRIPTION OF THE PREFERRED EMBODIMENT

Figure 1:
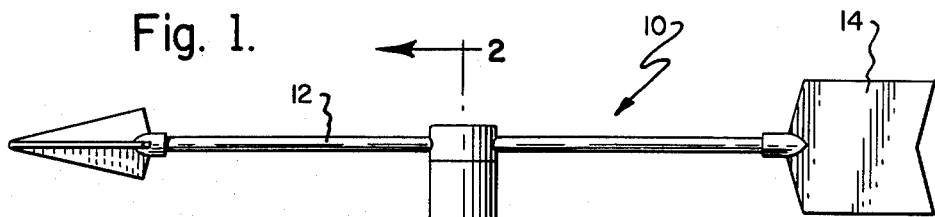
FIG. 1 is a side elevation of the preferred form of the wind velocity indicator of the present invention, showing the disk in a plurality of different elevations corresponding to different values of wind speed.

While the invention disclosed herein is susceptible of various modifications and alternative constructions, there is shown in the drawings and described hereafter both a preferred and an alternate embodiment. It is to be understood, however, that the descriptions hereunder are not intended to limit the invention to the specific forms disclosed. On the contrary, it is intended to cover all modifications and alternative constructions falling within the spirit and scope of the invention as expressed in the appended claims. Shown in the drawings is a wind driven apparatus for producing an indication of the prevailing wind conditions including a rough indication of wind speed and an indication of wind direction. The device serves the general function of satisfying one's curiosity regarding the velocity of the wind prevailing in the vicinity of an observation post such as a dwelling or other occupied building. The apparatus is intended to be mounted in a position exposed to the prevailing winds and in a position visible from the shelter of the building. Such a position is usually found in a homeowner's front yard which is not only visible to the occupants of the structure but also visible to neighbors and passersby. Accordingly, the wind velocity indicating device has been designed to have an ornamental and attractive appearance and to provide the functional purpose of giving indications as to wind speed and direction.

Turning now to FIGS. 1 and 5, the velocity indicating device has been shown in two different embodiments. In FIG. 1, a vertically disposed shaft, tube or rod 18 is mounted in a base 16 which may be suitably fixed to a fence post, garage roof, or other suitable position. Pivotally attached to the top of rod 18 is an arrow vane 12 or other attractive weather vane device having a rudder 14 which directs the vane 12 in response to the prevailing wind conditions. In the embodiment shown in FIG. 1, arrow vane 12 is mounted to pivot independently of rod 18 whereas in the embodiment shown in FIG. 5, the arrow vane 12 is rigidly connected to the top of the rod 18 which is itself pivotally mounted in base 16. In this second embodiment, rod 18 includes a bend which causes rod 18 to deviate slightly from the vertical. With this arrangement, arrow vane 12 operates to rotate rod 18 so that the top of rod 18 always points in a direction away from the wind direction.

Carried on rod 18 in both embodiments is a rotatable disk like member 20 or 30 which may resemble a flying saucer and which is mounted to permit the disk to rotate freely about its symmetrical axis of rotation and to move relatively freely along the length of rod 18. In both embodiments, the apparatus is configured to present a lower surface 22 of the disk (20,30) into the prevailing wind direction in a manner which causes the wind to exert a lifting force on the disk so that when a sufficiently high wind blows, the disk will tend to ride up the rod from its lowermost position defined by lower stop 28. As the disk ascends the rod, it encounters a portion of the apparatus generally indicated at 40 in FIGS. 1 and 50 in FIG. 5, whose function is to render upward movement of the rising disk successively more difficult by placing weights on the top surfaces of the disk in a manner which is proportional to the distance that the disk travels up rod 18.

Figure 2:
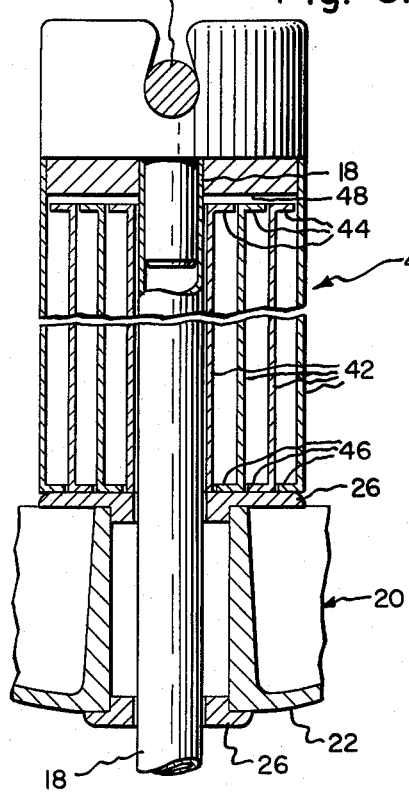
FIGS. 2 and 3 are cross-sectional details of the telescopic weight adding mechanism of FIG. 1 shown in telescopically extended and contracted positions respectively.
Figure 3:
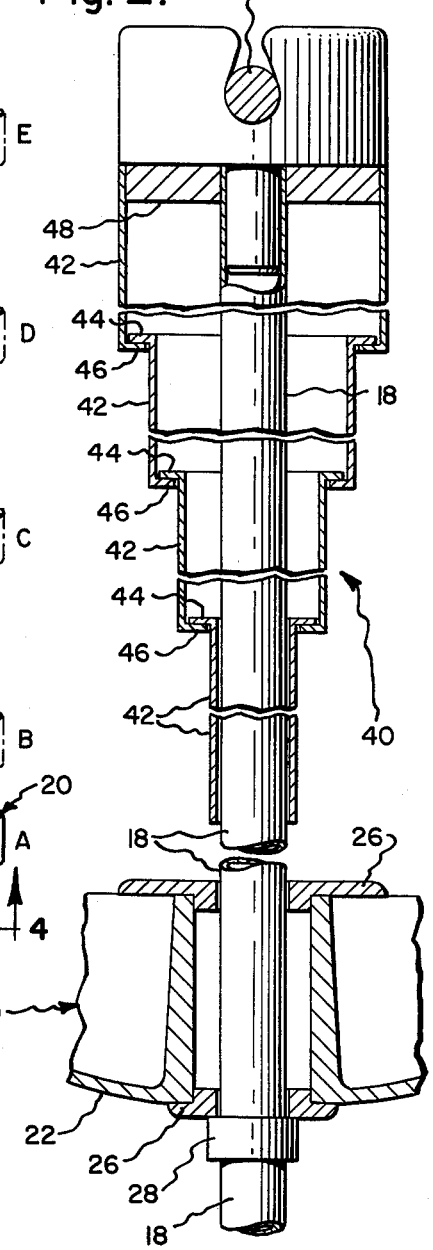
Figure 4:
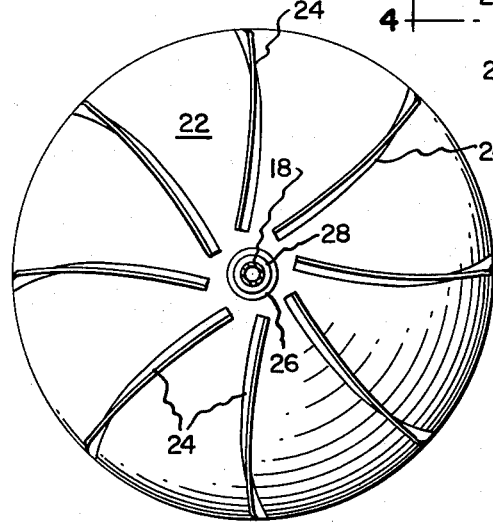
FIG. 4 is a bottom plan view of the disk shown in FIG. 1.

Turning now to the embodiment shown in FIGS. 1, 2, 3 and 4, disk 20, as best seen in FIGS. 1 and 4, includes a lower downwardly facing convex surface 22. The upper surface of disk 20 (not shown) may either be a planar surface lying in the plane of rotation of disk 20 or a concave surface which is merely the upper side of the downwardly facing convex surface 22. Whereas any number of arrangements are conceivable, the critical requirement for the disk is that the net upwardly lifting wind created force caused by the shape of disk 20 exceed the downwardly directed wind created force.

Vanes or air scoops 24 are included on disk 20 to catch the passing air and to cause disk 20 to rotate. Rotation of disk 20 substantially lessens the frictional resistance to upward movement of the disk along rod 18. In this respect, the spring loaded toy as disclosed in previously mentioned U.S. Pat. No. 2,919,577 is much less sensitive since, due to its design, it must overcome the relatively large static friction forces each time its elevation is changed rather than the relatively small rotational friction encountered in the present invention. Accordingly, as is well known, vanes or air scoops 24 are formed in a manner which permits them to catch the air on one side thereof and slip through the air on the other side thereby producing a net wind induced rotational moment. Friction is further reduced by the provision of bearings 26 positioned around the rod 18 and located at the top and bottom sides of the disk 20. Such bearings 26 may desirably consist of teflon washers (or other low friction material) so that a minimum of wind energy is required to cause the disk to rotate and to climb rod 18. In this respect, it is also desirable that disk 20 be constructed to have a light weight to enable disk 20 to begin to rise on the occurence of relatively low wind speeds. A suitable disk may be constructed of high density polyethelene plastic by blow-molding techniques. With this material and technique, a thin, lightweight, yet strong disk may be constructed.

In FIGS. 2 and 3, system 40 provided for successively adding weights to the top of disk 20 as it ascends rod 18 is shown. In the preferred form, weight adding system 40 consists of a plurality of telescoping cylinders 42 which telescope into one another as they encounter and are lifted by the ascending disk 20. Hence, each of the plurality of telescoping cylinders 42 is suspended from the cylinder above by means of the interaction of outwardly projecting flanges 44 and inwardly projecting flanges 46. The top cylinder 42 is shown suspended by means of a spacer element 48 which is fixed both to cylinder 42 and to rod 18. As can be seen, FIG. 2 shows the system in a telescopically extended "down" configuration while FIG. 3 shows the system in a telescopically contracted "up" configuration. While it is desirable that each of the successive cylinders 42 nest into the next higher adjacent cylinder to avoid water accumulation, the inverse arrangement is possible in which the highest cylinder 42 slides into and is received within the next lower adjacent cylinder.

With the above described construction, the apparatus disclosed operates in the following manner. Initially, when there is no prevailing wind, disk 20 rests at its lower most position (A) supported by stop member 28. Upon the occurence of a breeze sufficient to overcome the friction between stop member 28 and disk 20, disk 20 begins to spin. As the breeze impinging on the lower surface 22 of the disk increases, a point will be reached at which the wind created lift on the disk exceeds the weight of the disk: at which time the disk will begin to rise along the rod until it reaches position (B) in contact with the lowest cylindrical weight member 42. As the breeze continues to intensify, the rotating disk will continue to remain at position (B) until the lift on disk 20 exceeds the combined weight of the disk and first element 42. At this time, the disk will once again ascend rod 18 carrying weight element 42 which telescopically rises up into the next adjacent cylinder 42' until the lowest cylinder 42 is completely concealed within cylinder 42' and the disk is at position (C). Thus, it can be seen that disk 20 will continue to reside at position (C) until the lift caused by the wind once again exceeds the combined gravitational forces of the weights of the disk 20 and the two cylindrical members 42 and 42'. Successive and similar behavior occurs at position (D) and at position (E) where the disk 20 reaches its highest elevation. Each position A-D is indicative of a different wind speed and is determined by the specific values of the weights of the disk 20 and of each cylinder 42.

As can be seen by the shading in FIG. 1, cylinders 42 are desirably formed with different external appearances such as by painting the exterior surface of each cylinder a different color. When this is done, it is possible to view the wind velocity indicator from a distance and to determine a minimum wind speed which corresponds to the color of the lowest visible cylinder 42. An alternative and equally as acceptable arrangement would be to provide rod 18 with different colored or different appearing sections corresponding to the lengths of the cylinders 42 so that as each of the cylinders 42 is telescopically pushed upwardly, a different color is exposed. With this situation, the wind speed would correspond to the highest color exposed.

Since as disk 20 rises along rod 18, it comes into contact with the lower edge of each of the cylinders 42, it is desirabel to provide a bearing surface which has a lower coefficient of friction. Therefore, the upper bearing washer 26 may consist of a Teflon or some similar low coefficient of friction material and have a diameter which is at least equivalent to the diameter of the next to top cylinder 42.

Turning now to the other embodiment disclosed in FIGS. 5–9, at least three differences are immediately apparent. These differences reside in the construction of the weight adding device 50, the construction of the rotatable disk 30, and the fact that the rod 18 is bent to form an angle with the vertical and further that rod 18 is rotatably mounted in the base 16. Looking first at FIG. 9, the mounting is shown as consisting of base 16 having an upwardly extending collar into which the lower portion of rod 18 loosely fits. Rod 18 is rotationally fixed in base 16 by means of upper and lower snap rings 56 which engage top and bottom surfaces of the collar of base 18. While the embodiment just described is an effective and inexpensive construction for the rotatable base mounting, any other suitable low friction rotatable mounting would suffice and therefore comes within the intended scope of the invention.

The second disclosed embodiment of the rotatable disk 30 includes top and bottom nearly identical halves and resemble pie plates in appearance. As may best be seen in FIG. 2, the top and bottom surfaces of the upper and lower halves of disk 30 have panels 34 folded out in a manner which permits them to act as air scoops for catching the wind as it passes the disk 30. In a manner similar to the air scoops 24 previously described, air scoops 34 cause the disk 30 to rotate. Additionally, panels 36 may also be cut and folded outwardly on the top surface of disk 30 for the further purpose of causing the disk to rotate. As may best be seen in FIG. 8, bearings 38 or grommets are provided for mounting the disk 30 on rod 18. Also in a manner similar to that previously described for disk 20, disk 30 is desirably made from a lightweight sheet material such as foil or lightweight plastic. The upper and lower halves of disk 30 may be fastened together around their mutually contacting rims.

Returning to an examination of FIG. 6, the general construction of the weight adding mechanism 50 may be seen. In this embodiment, the weight adding mechanism 50 comprises a bellows type structure 52 which is suspended from the top of rod 18 and which extends down around rod 18 to a lower position close to but spaced from the rest position of disk 30 as defined by stop member 28. Bellows 52 consists of a plurality of elements 54 which are flexibly attached to one another in a manner which permits them to collapse from the bottom up when an upwardly exerted force is applied to the bottom of the bellows by an ascending rotating disk 30. FIG. 6 shows the disk 30 and the bellows 52 in solid lines in their lower positions A. Disk 30 and partially collapsed bellows 52 are also shown in an intermediate position B in which the disk 30 has climbed to a point where a portion of the elements 54 are being vertically supported by the disk 30 in raised and collapsed positions.

When the wind blows and impinges on the embodiment shown in FIG. 6, the first effect noticed is that rudder 14 and arrow 12 are deflected to point into the wind direction, thereby rotating shaft 18 in the pivotal mount 16. This causes the top of shaft 18 to point away from the wind direction in a manner which tilts disk 30 so that the bottom surface 22 of disk 30 is exposed to the prevailing winds. Simultaneously, disk 30 begins to rotate as a result of the interaction of the wind with air scoops 34 and 36. When a high enough wind velocity is obtained, the disk is caused to lift off of the end stop 28 and to ascend shaft 18 until disk 30 comes into contact with the lower portion of the collapsible bellows 52. At this point, the upward movement of disk 30 is terminated until the wind velocity achieves a point where the wind begins to lift both the disk 30 and the lowermost portion of bellows 52. In this embodiment, as opposed to being a purely incremental weight adding mechanism, bellows 52 may be designed in a manner which causes weights to be added to the top of the ascending disk in a nearly continuous manner so that a purely step-like ascending behavior previously described for the embodiment of FIG. 1 is not encountered.

A desirable technique for rendering the wind velocity of the device remotely readable, is to cause the shaft 18 to change appearance with altitude along the shaft. In a manner similar to that previously described, this change of appearance may be accomplished by providing shaft 18 with different colorations therealong so that as disk 30 and bellows 52 are forced up rod 18 by the wind, different bands of colors are exposed which may be remotely observed and translated into indications of wind speed.

While two embodiments of a suitable weight adding means has been described, it is not intended that the invention be limited to these specific designs. Thus it is intended that the scope of the invention also cover a weight adding sustem which is positioned below and is lifted by the disk such as a telescopically extendible series of cylinders similar to those described and such a bellows which is initially in a contracted position and which is lifted and extended by the climbing disk. In this respect, the simplest conceivable arrangement includes a strand like flexible element attached to the disk and collected and supported at a position close to the rest position of the disk. Thus, as the disk climbs, more and more of the strand like flexible element (such as a chain) would be supported by the disk in a manner proportional to the elevation of the disk.

What is claimed is:

1. An apparatus for indicating wind speed, said apparatus comprising in combination:
   a. a base member for mounting said apparatus;
   b. a generally vertically disposed shaft held by said base;
   c. a disk mounted on said shaft for both rotational movement about its rotational axis of symmetry and generally vertical movement along said shaft; and d. means mounted on said shaft for adding increments of weight to said disk at different vertical elevations of said disk up said shaft.

2. The wind speed apparatus as recited in claim 1 wherein said means mounted on said shaft for adding weight to said disk includes means for incrementally adding weight to said disk in proportion to the distance said disk moves up said shaft.

3. The wind speed apparatus as recited in claim 2 wherein said means for incrementally adding weight to said disk in proportion to the distance said disk moves up said shaft includes a cylindrical bellows having adjacent elements each flexibly attached to the next adjacent element, said cylindrical bellows being suspended by one end thereof from a vertically elevated portion of said shaft.

4. The wind speed apparatus as recited in claim 1 wherein said means for adding weights to said disk includes a plurality of telescoping members, each successive telescoping member depending from the next higher telescoping member.

5. The wind speed apparatus as recited in claim 4 wherein each telescoping member is adapted to receive therewithin the next lower member.

6. The wind speed apparatus as claimed in claim 1 wherein said apparatus includes means for presenting a lower inclined surface of said disk into the wind and for causing the wind to exert a vertical lift on said disk.

7. The wind speed apparatus as claimed in claim 6 wherein said disk includes air scoops attached thereto for catching the wind and for causing said disk to rotate around its rotational axis of symmetry.

8. The wind speed apparatus as recited in claim 7 wherein said means for presenting a lower inclined surface into the wind for causing the wind to exert a vertical lift on said disk includes a disk having a convex lower surface.

9. The wind speed apparatus as recited in claim 8 wherein said shaft is held by said base member in a vertical orientation.

10. The wind speed apparatus as recited in claim 8 wherein said means mounted on said shaft for adding weight to said disk includes means for incrementally adding weight to said disk in proportion to the distance said disk moves up said shaft.

11. The wind speed apparatus as recited in claim 10 wherein said means for adding weights to said disk includes a plurality of telescoping members, each successive telescoping member depending from the next higher telescoping member.

12. The wind speed apparatus as recited in claim 6 wherein said means for presenting a lower inclined surface into the wind and for causing the wind to exert a vertical lift on said disk includes:

a. means for angling said shaft to the vertical; and b. means connected to said shaft for rotating said shaft in response to the direction of the wind so that the top of said shaft leans away from the wind direction.

13. The wind speed apparatus as recited in claim 12 wherein said means mounted on said shaft for adding weight to said disk includes means for incrementally adding weight to said disk in proportion to the distance said disk moves up said shaft.

14. The wind speed apparatus as recited in claim 13 wherein said means for adding weights to said disk includes a plurality of telescoping members, each successive telescoping member depending from the next higher telescoping member.

15. The wind speed apparatus as recited in claim 1 further including remotely visible means on said apparatus for permitting visual determination of wind speed.

16. The wind speed apparatus as recited in claim 15 wherein said remotely visible means for permitting visual determination of wind speed includes means for causing a plurality of vertically spaced portions of said apparatus to have a different visual appearance.

17. The wind speed apparatus as recited in claim 16 wherein said remotely visible means includes differently colored portions of said generally vertically disposed shaft.

18. The wind speed apparatus as recited in claim 16 wherein said remotely visible means includes differently colored portions of said weight adding means.

* * * * *